US011434587B2

(12) United States Patent
Kopping et al.

(10) Patent No.: US 11,434,587 B2
(45) Date of Patent: Sep. 6, 2022

(54) FILAMENTS FOR USE AS A SUPPORT MATERIAL IN FUSED DEPOSITION MODELING

(71) Applicant: BASF SE, Ludwigshafen am Rhein (DE)

(72) Inventors: Jordan Thomas Kopping, Ludwigshafen am Rhein (DE); Marie-Claire Hermant, Ludwigshafen am Rhein (DE); Kris Schmidt, Cambridge, MA (US); Nikolaus Nestle, Ludwigshafen am Rhein (DE); Alexander Koehler, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 358 days.

(21) Appl. No.: 16/468,333

(22) PCT Filed: Dec. 6, 2017

(86) PCT No.: PCT/EP2017/081597
§ 371 (c)(1),
(2) Date: Jun. 11, 2019

(87) PCT Pub. No.: WO2018/108639
PCT Pub. Date: Jun. 21, 2018

(65) Prior Publication Data
US 2019/0352804 A1 Nov. 21, 2019

(30) Foreign Application Priority Data
Dec. 13, 2016 (EP) ..................... 16203641

(51) Int. Cl.
| *D01F 8/04* | (2006.01) |
| *B33Y 10/00* | (2015.01) |
| *B33Y 70/00* | (2020.01) |
| *B29C 64/118* | (2017.01) |
| *B29C 64/40* | (2017.01) |
| *B28B 1/00* | (2006.01) |

(52) U.S. Cl.
CPC .............. *D01F 8/04* (2013.01); *B28B 1/001* (2013.01); *B29C 64/118* (2017.08); *B29C 64/40* (2017.08); *B33Y 10/00* (2014.12); *B33Y 70/00* (2014.12)

(58) Field of Classification Search
CPC ....... B28B 1/001; B29C 64/40; B29C 64/118; B33Y 70/00; B33Y 10/00; D01F 8/04
See application file for complete search history.

(56) References Cited

U.S. PATENT DOCUMENTS

| 4,767,813 A | 8/1988 | Evitt |
| 5,121,329 A | 6/1992 | Crump |
| 5,145,900 A | 9/1992 | Sterzel et al. |
| 5,645,781 A | 7/1997 | Popovic' et al. |
| 5,738,817 A | 4/1998 | Danforth et al. |
| 5,900,207 A | 5/1999 | Danforth et al. |
| 2002/0130434 A1 | 9/2002 | Rigali et al. |
| 2009/0288739 A1 | 11/2009 | Wohlfromm et al. |
| 2012/0033002 A1 | 2/2012 | Seeler et al. |
| 2012/0231225 A1 | 9/2012 | Mikulak et al. |
| 2015/0080495 A1 | 3/2015 | Heikkila |
| 2016/0024293 A1 | 1/2016 | Nestle et al. |
| 2018/0171035 A1 | 6/2018 | Marguerre et al. |
| 2018/0202076 A1 | 7/2018 | Van Der Schaaf et al. |
| 2019/0090529 A1 | 3/2019 | Meyer-Boehm et al. |
| 2019/0233334 A1 | 8/2019 | Stuhrmann et al. |

FOREIGN PATENT DOCUMENTS

| CN | 103881289 A | 6/2014 |
| CN | 104057090 A | 9/2014 |
| CN | 105504662 A | 4/2016 |
| CN | 105665697 A | 6/2016 |
| CN | 105728729 A | 7/2016 |
| DE | 102013004182 A1 | 9/2014 |
| GB | 1194592 A | 6/1970 |
| WO | WO-2013117428 A1 | 8/2013 |
| WO | WO-2015006697 A1 | 1/2015 |
| WO | WO-2015077262 A1 | 5/2015 |
| WO | WO-2016012486 A1 | 1/2016 |
| WO | 2016/059986 A1 | 4/2016 |
| WO | WO-2017009190 A1 | 1/2017 |
| WO | WO-2017182314 A1 | 10/2017 |
| WO | WO-2018033620 A1 | 2/2018 |
| WO | WO-2018041642 A1 | 3/2018 |
| WO | WO-2018050517 A2 | 3/2018 |
| WO | WO-2018060015 A1 | 4/2018 |

OTHER PUBLICATIONS

U.S. Appl. No. 16/336,660, Martin et al.
European Search Report for EP 16203641.2 dated Feb. 21, 2017.
International Search Report for PCT/EP2017/081597 dated Jan. 9, 2018.
Written Opinion of the International Searching Authority for PCT/EP2017/081597 dated Jan. 9, 2018.

*Primary Examiner* — Larry W Thrower
(74) *Attorney, Agent, or Firm* — Faegre Drinker Biddle & Reath LLP

(57) ABSTRACT

The present invention relates to the use of a filament comprising a core material (CM) comprising a ceramic material precursor (CMP) and the core material (CM) is coated with a layer of shell material (SM) comprising a thermoplastic polymer as a support material in a fused filament fabrication process. Further, the invention relates to three-dimensional objects and a process for the preparation thereof.

9 Claims, No Drawings

FILAMENTS FOR USE AS A SUPPORT MATERIAL IN FUSED DEPOSITION MODELING

CROSS-REFERENCE TO RELATED APPLICATIONS

This application is a national stage application (under 35 U.S.C. § 371) of PCT/EP2017/081597, filed Dec. 6, 2017, which claims benefit of European Application No. 16203641.2, filed Dec. 13, 2016.

The present invention relates to the use of a filament comprising a core material (CM) comprising a ceramic material precursor (CMP) and the core material (CM) is coated with a layer of shell material (SM) comprising a thermoplastic polymer as a support material in a fused filament fabrication process. Further, the invention relates to three-dimensional objects and a process for the preparation thereof.

One of the most used 3D printing technologies or additive manufacturing technology is the fused deposition modeling (FDM), also known as fused filament fabrication process (FFF). For the production of three-dimensional objects, usually filaments of thermoplastic materials, provided on a spool, are deposited layer-by-layer through a heated nozzle on a base. Therefore, the thermoplastic material is heated to a temperature past its melting and/or glass transition temperature. The thermoplastic material and the temperature gradient are selected in order enable its solidification essentially immediately upon contacting the base or a preceding layer of thermoplastic material extruded.

In order to form each layer, drive motors are provided to move the base and/or the extrusion nozzle (dispending head) relative to each other in a predetermined pattern along the x-, y- and z-axis. Fused deposition modeling (FDM) was first described in U.S. Pat. No. 5,121,329. Typical materials for the production of three-dimensional objects are thermoplastic materials. The production of three-dimensional metallic or ceramic objects by fused filament fabrication is only possible if the metal or ceramic material has a low melting point so that it can be heated and melted by the nozzle. If the metal or ceramic material has a high melting point, it is necessary to provide the metal or ceramic material in a low melting binder composition to provide flowability to the extrusion nozzle. The binder composition usually comprises a thermoplastic material. When depositing the composite mixture of a metal or ceramic material in a binder on a base, the formed three-dimensional object is a so called "green body" which comprises the metal or ceramic material in a binder. To receive the desired metallic or ceramic object, the binder has to be removed through chemical or thermal means and finally the object has to be sintered to form the solid metal or ceramic part.

GB1194592 describes fibrous filler and thickening agents consisting of fibrous polyoxymethylene and finely divide inorganic oxide are prepared by (a) forming a pure, fibrous morphologically uniform polyoxymethylene by catalytic polymerisation of trioxane; (b) reducing the size of the fibrous polyoxymethylene; and (c) mixing the size reduced polyoxymethylene with 5-50% wt. of a highly dispersed pyrogenic or precipitated oxide, mixed oxide, or oxide mixture of metals and/or metalloids. The oxide is preferably an oxide of aluminum and/or titanium and/or silicon. An intimate mixture of the polyoxymethylene and oxide may be produced continuously by blast milling. The products are excellent thickening agents, and are also useful as fillers for elastomers and plastics.

U.S. Pat. No. 5,645,781 relates to a method for preparing a green fibrous monolith comprising extruding at least a first feed rod to provide a green ceramic fiber, the first feed rod being prepared by forming a first ceramic-laden composition comprising a thermoplastic polymer and at least about 40 vol. percent of a ceramic particulate into a substantially cylindrical core and applying a second ceramic-laden composition comprising a thermoplastic polymer and at least about 40 vol. percent of a ceramic particulate which differs from the first ceramic-laden composition onto the core, and forming a green ceramic monolith by shaping at least the green ceramic fiber, wherein during the extrusion step, each ceramic-laden composition has a viscosity that is approximately equivalent to that of each other ceramic-laden composition. The green fibrous monolith may be sintered to provide a fibrous monolith.

CN105504662A relates to a polyformaldehyde wire material for 3D printing and a preparation method thereof.

U.S. Pat. Nos. 5,738,817 and 5,900,207 describe a fused deposition modeling process for making a three-dimensional article by using a mixture of a particulate composition dispersed in a binder. The particulate composition comprises ceramic materials, elemental metals, metal alloys and/or steels. The binder consists of a polymer, a wax, an elastomer, a tackifier and a plasticizer. The binder is removed from the article by a burnout cycle during which the article is slowly heated to cause some of the components of the binder system to melt and flow out of the article. After these components are removed from the article, the temperature is increased and the other components of the binder are thermally decomposed and are removed from the article by diffusion and evaporation.

US2012/0033002 describes a process for the preparation of three-dimensional thermomagnetic objects by fused filament fabrication using a mixture of a thermomagnetic powder and a binder system. This binder system comprises polymers like polyesters, polysulfones, poly(ether sulfones) and styrene copolymers. After the printing of the three-dimensional object, the binder has to be removed. For this step step, very high temperatures are necessary.

DE102013004182A1 relates to a printing composition for use in 3D printers that work with direct FDM printing process. The printing composition consists of an organic binder component of one or more polymers and an inorganic component of metals, hard materials with binder metals or ceramic materials. After printing, the molded green body is sintered.

WO2015006697 discloses filaments adapted for use in an additive manufacturing system, the system comprising a digitally controlled applicator that can deposit a filament in a controlled x-y plane and in a z-direction filament application to obtain an pre-form object; the filament comprising: (a) about 70 to 1 weight percent of a thermoplastic polymer; and (b) about 99 to 30 weight percent of a metal particulate, dispersed in the polymer, particulate having a particle size of less than 500 microns, and exterior coating of interfacial modifier in an amount of about 0.005 to 10.0 weight percent, all percentages based on the weight of the filament.

US2012/0231225 discloses filaments for use in an extrusion-based additive manufacturing system. These filaments comprise a core portion of a first thermoplastic polymer and a shell portion of a second thermoplastic polymer that is compositionally different from the first thermoplastic material. In some embodiments of the filaments disclosed in US2012/0231225, the material of the core portion and the shell portion exhibit different crystallization temperatures. This difference in crystallization temperatures is desired, since it "reduces distortions, internal stresses, and sagging of the semi-crystalline polymeric materials when deposited as extruded roads to form layers of 3D models." Inorganic materials are not involved in any of the filaments mentioned.

CN105728729 discloses a preparation method of metal-ceramic composites, including: mixing thermoplastic binders and metal powder or ceramic powder, extrusion molding to obtain printing materials for fused deposition type 3D printer; adding the above printing materials into fused deposition type 3D printer, printing into shaped embryo, degreasing to remove part of the thermoplastic binder, and sintering. The fused deposition type 3D printer can be used for printing products contg. metal or ceramics.

CN105665697 discloses discloses a metal or ceramic consumable for FDM 3D printing, prepared from polymer material 15-50, compatibilizer 0-2, metal or ceramic powder 50-80, antioxidant 0.1-1 and lubricant 0.1-2 wt. parts. The polymer material is from polypropylene, polyethylene, polyvinyl alc., polylactic acid, etc. The metal powder is from aluminum, iron, copper, silver, gold, titanium, etc. The ceramic is from silicon oxide, alumina, clay, quartz, talc, etc. The preparation method of the metal or ceramic consumable includes weighing materials, mixing metal powder or ceramic powder with compatibilizer, stirring, adding other materials, extruding with twin-screw extruder, cooling, drying, dicing to obtain polymer-bonded metal or ceramic granule, extruding with single-screw extruder, cooling, drying, stretching and winding to obtain the metal or ceramic consumable. The printing method of the metal or ceramic consumable includes printing and forming of the metal or ceramic consumable with FDM 3D printer, degreasing, high-temp. sintering and polishing.

CN103881289 describes a support material which comprises 80-100 wt. % of polyformaldehyde, 0-7 wt. % of a surfactant (silicone oil, paraffin or titanate) and 0-13 wt. % of a filler (calcium carbonate and/or talc), wherein the polyformaldehyde content is less than 100% and the content of the filler and surfactant is greater than 0. The support material is produced by mixing the raw materials in a plastic blender for 1-2 min to obtain a premix, and extruding and drawing the premix with a single screw extruder or a twin screw extruder, while controlling the wire diameter at 1.75 mm, to obtain the modified polyformaldehyde support material for 3D printing.

CN104057090A The invention discloses a method for removing printing metal, ceramic product metal, mixed material of ceramic powder (as a material component) and a polymer adhesive agent and the polymer adhesive agent from a finished printing product.

US2002130434 relates to method for continuous fibrous monolith composite coextrusion comprising: a) producing a first material-laden composition comprising a thermoplastic polymer and at least about 40 volume percent of a ceramic or metallic particulate; b) extruding the first material laden composition into a filament; c) producing a second material-laden composition comprising a thermoplastic polymer and at least about 40 volume percent of a ceramic or metallic particulate that is different in composition than the first material laden composition; d) passing the filament through an coextrusion assembly, the coextrusion assembly comprising an extrusion head, a tapered nozzle, a spinnerette, a spinnerette housing, a guide rod support, and a guide rod; e) coating the filament with the second material-laden composition as the filament passes through the coextrusion assembly to form a coated filament; f) arranging the coated filament into a desired architecture to form a fibrous monolith composite.

US2015080495 discloses filaments adapted for use in an additive manufacturing system, the system comprising a digitally controlled applicator that can deposit a filament in a controlled x-y plane and in a z-direction filament application to obtain an pre-form object; the filament comprising: (a) about 70 to 1 weight percent of a thermoplastic polymer; and (b) about 99 to 30 weight percent of a metal particulate, dispersed in the polymer, particulate having a particle size of less than 500 microns, and exterior coating of interfacial modifier in an amount of about 0.005 to 10.0 weight percent, all percentages based on the weight of the filament.

WO2016/012486 describes the use of a mixture (M) comprising (a) from 40 to 70 percent by volume of an inorganic powder (IP) based on the total volume of the mixture (M), (b) from 30 to 60 percent by volume based on the total volume of the mixture (M) of a binder (B) comprising (b1) from 50 to 96 percent by weight of at least one polyoxymethylene (POM) based on the total weight of the binder (B), (b2) from 2 to 35 percent by weight of at least one polyolefin (PO) based on the total weight of the binder (B), (b3) from 2 to 40 percent by weight of at least one further polymer (FP) based on the total weight of the binder (B) in a fused filament fabrication process and a process for producing three-dimensional objects by a fused filament fabrication process. However, a filament comprising a core material and an additional shell material is not disclosed.

WO2015/077262 discloses filaments as 3D printer inputs comprising separated layers or sections. These layers may comprise different materials, such as polymers, carbon fiber, fiber glass, wood fiber, nanocellulose fiber or carbon nanotubes. But WO2015/07726 does not disclose the combination of an inorganic powder and at least one binder as core material and at least one thermoplastic polymer as shell material.

WO2017009190 discloses filaments comprising a core material (CM) coated with a layer of shell material (SM), wherein the core material (CM) comprises the components a) to c)

a) 30 to 80% by volume, based on the total volume of the core material (CM) of at least one inorganic powder (IP), b) 20 to 70% by volume, based on the total volume of the core material (CM) of at least one binder (B) comprising component b1)

b1) at least one polymer (P)

c) 0 to 20% by volume, based on the total volume of the core material (CM) of at least one additive (A), and the shell material (SM) comprises the components d) to f)

d) 75 to 100% by volume, based on the total volume of the shell material (SM) of at least one thermoplastic polymer (TP)

e) 0 to 20% by volume, based on the total volume of the shell material (SM) of the at least one inorganic powder (IP), f) 0 to 25% by volume, based on the total weight of the shell material (SM) of the at least one additive (A), wherein the thickness of the layer of shell material is 0.05 to 0.5 mm.

The object underlying the present invention is to provide a material which functions as a support material for metal filaments in 3D printing.

Accordingly, the present invention is directed to the use of a filament comprising a core material (CM) coated with a layer of shell material (SM), wherein the core material (CM) comprises the components a) to c)

a) 30 to 80% by volume, based on the total volume of the core material (CM) of at least ceramic material precursor (CMP), b) 20 to 70% by volume, based on the total volume of the core material (CM) of at least one binder (B) comprising component b1)

b1) at least one polymer (P)

c) 0 to 20% by volume, based on the total volume of the core material (CM) of at least one additive (A), and the shell material (SM) comprises the components d) to f)

d) 75 to 100% by volume, based on the total volume of the shell material (SM) of at least one thermoplastic polymer (TP)

e) 0 to 20% by volume, based on the total volume of the shell material (SM) of the at least one ceramic material precursor (CMP), f) 0 to 25% by volume, based on the total weight of the shell material (SM) of the at least one additive (A), wherein the thickness of the layer of shell material is 0.05 to 0.5 mm as a support material in a fused filament fabrication process.

The ceramic material formed from the ceramic material precursor (CMP) has poor adhesion with metals, can easily be remove after the sinter process, has a similar shrinkage and forms a solid structure in the sintering, just like with metal powders.

One advantage of the filaments is their higher mechanical stability compared to filaments prepared from the same core material (CM) but without the shell material (SM). In particular, the filaments can be rolled on a spool, while filaments without shell material (SM) are usually too brittle and therefore are not suited to be spooled.

Since the mechanical properties and therefore the processability of the filaments in a conventional machine for a fused filament fabrication process (FFF) are mainly determined by the shell material (SM), there is more freedom of variation in regard to the composition of the core material (CM) compared to filaments without a shell material (SM). For example, the shell material (SM)-core material (CM) configuration allows for the use of significantly higher loads of ceramic material precursor in the core material (CM) or ultra-low viscosity binders and/or additives in the core material (CM) that could result in a more brittle core. Without a layer of shell material (SM) it was not possible to consistently feed highly brittle material in the conventional machines used in the fused filament fabrication process (FFF). Furthermore, it is also possible that the inventive filaments exhibit a tacky or extremely tacky core material (CM), which would without the presence of the shell material (SM) block the feeder mechanism. Consequently, by the inventive process filaments for the application in a fused filament fabrication process (FFF) can be realized, which obtain a core material (CM) of ultra-low viscosity or of extreme tackiness.

The core material (CM) shows a good flowability at the processing temperatures and at the shear rates used in a conventional Fused Deposition Modeling (FDM) process. Moreover, no demixing of the ceramic material precursor (CMP) and the binder (B) of the core material (CM) occurs and usually no stress cracks arise during the hardening. Another advantage of the present invention is that the binder (B) can easily be removed at temperatures below the melting point of the binder (B), resulting in only little or even no deformation of the three-dimensional object.

In one embodiment of the invention Polyoxymethylene (POM) is present in the binder (B). Polyoxymethylene (POM) as component of the binder (B) exhibits a high crystallization rate and hardens quickly. Furthermore, polyoxymethylene (POM) is not known to be a sticky polymer as it has a low coefficient of friction.

The invention is specified in more detail as follows.

The filament comprises a core material (CM) coated with a layer of shell material (SM).

The filament may exhibit any length and/or diameter as deemed appropriate by the person skilled in the art.

Preferably, the diameter of the filament is 1.5 to 3.5 mm, more preferably 2.0 to 3.1 mm, most preferably 2.6 to 3.0 mm.

The layer of shell material (SM) may have any thickness as deemed appropriate by the person skilled in the art. Preferably, the thickness of the layer of shell material (SM) is 0.04 to 0.50 mm, more preferably 0.09 to 0.4 mm, most preferably 0.1 to 0.3 mm (diameter of filament–diameter core material (CM)=thickness of the layer of shell material (SM)).

The core material (CM) may have a diameter as deemed appropriate by the person skilled in the art. Preferably the diameter of the core material is 1.5 to 3.0 mm, more preferably 1.9 to 2.7 mm, most preferably 2.2 to 2.7 mm.

In another embodiment of the present invention, the diameter of the filament is 1.5 to 2.0 mm, more preferably 1.6 to 1.9 mm, most preferably 1.6 to 1.8 mm.

Preferably, the thickness of the layer of shell material (SM) is 0.01 to 0.3 mm, more preferably 0.02 to 0.2 mm, most preferably 0.02 to 0.1 mm.

Preferably the diameter of the core material is 1.5 to 1.7 mm, more preferably 1.6 to 1.7 mm, most preferably 1.6 to 1.7 mm.

The core material (CM) comprises the components a) to c).

The core material (CM) comprises as component a) 30 to 80% by volume, preferably 40 to 68% by volume, more preferably 50 to 65% by volume, based on the total volume of the core material (CM), of at least one ceramic material precursor (CMP).

The terms "component (a)" and "ceramic material precursor (CMP)" for the purpose of the present invention are synonymous and are used interchangeably throughout the present invention.

As component a), any known ceramic material precursor (CMP) can be used. Preferably, a sinterable ceramic material precursor (CMP) is used as component a). "A ceramic material precursor (CMP)" means precisely one ceramic material precursors as well as mixtures of two or more ceramic material precursors.

The ceramic material obtained after sintering of the ceramic material precursor (CMP) may have the same chemical composition as the ceramic material precursor (CMP).

"A ceramic material" means precisely one ceramic material as well as mixtures of two or more ceramic materials. In the context of the present invention, the term "ceramic material" means a non-metallic compound of a metal or a first metalloid, and a non-metal or a second metalloid.

"A metal" means precisely one metal and also mixtures of two or more metals. The same relies to "a non-metal" and "a first metalloid", as well as "a second metalloid". "A non-metal" means precisely one non-metal and also mixtures of two or more non-metals. "A first metalloid" means precisely one first metalloid and also mixtures of two or more first metalloids. "A second metalloid" means precisely one second metalloid and also mixtures of two or more second metalloids.

The non-metal according to the present invention can be selected from any non-metal of the periodic table. Preferably, the at least one non-metal is selected from the group consisting of carbon, nitrogen, oxygen, phosphorus and sulfur.

The first metalloid and the second metalloid can be selected from any metalloid of the periodic table. Preferably, the first metalloid and/or the second metalloid are selected from the group consisting of boron and silicon. It should be clear that the first metalloid and the second metalloid differ from each other. For example, if the first metalloid is boron, then the second metalloid is selected from any other metalloid of the periodic table of the elements besides boron.

In one embodiment of the present invention, the ceramic material is selected from the group consisting of oxides, carbides, borides, nitrides and silicides. In a preferred embodiment the ceramic material is selected from the group consisting of MgO, CaO, $SiO_2$, $Na_2O$, $Al_2O_3$, $ZrO_2$, $Y_2O_3$, SiC, $Si_3N_4$, TiB and AlN. Particularly preferred, the ceramic material is selected from the group consisting of $Al_2O_3$, $ZrO_2$ and $Y_2O_3$.

The ceramic material obtained after sintering of the ceramic material precursor (CMP) may have a different chemical composition than the ceramic material precursor (CMP).

For example, sintering of $CaCO_3$ may result in CaO and sintering of $CaCO_3$ and $SiO_2$ may result in $CaSiO_3$.

For the preparation of the filaments, the ceramic material precursor (CMP) has to be pulverized. To pulverize the ceramic material precursor (CMP), any method known to the person skilled in the art can be used. For example, the inorganic material can be ground. The grinding for example can take place in a classifier mill, in a hammer mill or in a ball bill.

The particle sizes of the ceramic material precursor (CMP) used as component a) are preferably from 0.1 to 80 ☐m, particularly preferably from 0.5 to 50 ☐m, more preferably from 0.1 to 30 ☐m, measured by laser diffraction.

The core material comprises (CM) comprises as component b) 20 to 70% by volume, preferably 20 to 60% by volume, more preferably 20 to 50% by volume, based on the total volume of the core material (CM), of at least one binder (B).

The terms "component b)" and "binder (B)" for the purpose of the present invention are synonymous and are used interchangeably throughout the present invention.

The binder (B) comprises a component b1) which is at least one polymer (P).

Preferably, the binder (B) comprises 50 to 96% by weight, more preferably 60 to 90% by weight, most preferably 70 to 85% by weight of the at least one polymer (P), based on the total weight of the binder (B), as component b1).

Preferably, the at least one polymer (P) is a polyoxymethylene (POM).

As component b1), at least one polyoxymethylene (POM) may be used. "At least one polyoxymethylene (POM)" within the present invention means precisely one polyoxymethylene (POM) and also mixtures of two or more polyoxymethylenes (POM).

For the purpose of the present invention, the term "polyoxymethylene (POM)" encompasses both, polyoxymethylene (POM) itself, i. e. polyoxymethylene (POM) homopolymers, and also polyoxymethylene (POM) copolymers and polyoxymethylene (POM) terpolymers.

Polyoxymethylene (POM) homopolymers usually are prepared by polymerization of a monomer selected from a formaldehyde source (b1a).

The term "formaldehyde source b1a)" relates to substances which can liberate formaldehyde under the reaction conditions of the preparation of polyoxymethylene (POM).

The formaldehyde sources b1a) are advantageously selected from the group of cyclic or linear formals, in particular from the group consisting of formaldehyde and 1,3,5-trioxane. 1,3,5-trioxane is particularly preferred.

Polyoxymethylene (POM) copolymers are known per se and are commercially available. They are usually prepared by polymerization of trioxane as main monomer. In addition, comonomers are concomitantly used. The main monomers are preferably selected from among trioxane and other cyclic or linear formals or other formaldehyde sources b1a).

The expression "main monomers" is intended to indicate that the proportion of these monomers in the total amount of monomers, i. e. the sum of main monomers and comonomers, is greater than the proportion of the comonomers in the total amount of monomers.

Quite generally, polyoxymethylene (POM) according to the present invention has at least 50 mol-% of repeating units —$CH_2O$— in the main polymer chain. Suitable polyoxymethylene (POM) copolymers are in particular those which comprise the repeating units —$CH_2O$— and from 0.01 to 20 mol-%, in particular from 0.1 to 10 mol-% and very particularly preferably from 0.5 to 6 mol-% of repeating units of the formula (I),

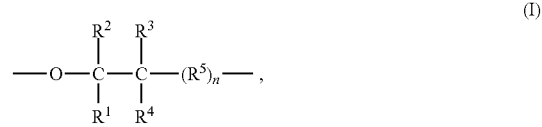

wherein
$R^1$ to $R^4$ are each independently of one another selected from the group consisting of H, $C_1$-$C_4$-alkyl and halogen-substituted $C_1$-$C_4$-alkyl;
$R^5$ is selected from the group consisting of a chemical bond, a (—$CR^{5a}R^{5b}$—) group and a (—$CR^{5a}R^{5b}O$—) group, wherein
$R^{5a}$ and $R^{5b}$ are each independently of one another selected from the group consisting of H and unsubstituted or at least monosubstituted $C_1$-$C_4$ alkyl,
wherein the substituents are selected from the group consisting of F, Cl, Br, OH and $C_1$-$C_4$-alkyl;
n is 0, 1, 2 or 3.

If n is 0, then $R^5$ is a chemical bond between the adjacent carbon atom and the oxygen atom. If $R^5$ is a (—$CR^{5a}R^{5b}O$—) group, then the oxygen atom (O) of the (—$CR^{5a}R^{5b}O$—) group is bound to another carbon atom (C) of formula (I) and not to the oxygen atom (O) of formula (I). In other words, formula (I) does not comprise peroxide compounds. The same holds true for formula (II).

Within the context of the present invention, definitions such as $C_1$-$C_4$-alkyl, as for example defined above for the radicals $R^1$ to $R^4$ in formula (I), mean that this substituent (radical) is an alkyl radical with a carbon atom number from 1 to 4. The alkyl radical may be linear or branched and also optionally cyclic. Alkyl radicals which have both a cyclic component and also a linear component likewise fall under this definition. Examples of alkyl radicals are methyl, ethyl, n-propyl, iso-propyl, butyl, iso-butyl, sec-butyl and tert-butyl.

In the context of the present invention, definitions, such as halogen-substituted $C_1$-$C_4$-alkyls, as for example defined above for the radicals $R^1$ to $R^4$ in formula (I), mean that the $C_1$-$C_4$-alkyl is substituted by at least one halogen. Halogens are F (fluorine), Cl (chlorine), Br (bromine) and I (iodine).

The repeating units of formula (I) can advantageously be introduced into the polyoxymethylene (POM) copolymers by ring-opening of cyclic ethers as first comonomers (b1b). Preference is given to first comonomers (b1b) of the general formula (II),

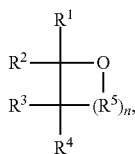
(II)

wherein
$R^1$ to $R^5$ and n have the meanings as defined above for the general formula (I).

As first comonomers b1b) mention may be made for example of ethylene oxide, 1,2-propylene oxide, 1,2-butylene oxide, 1,3-butylene oxide, 1,3-dioxane, 1,3-dioxolane and 1,3-dioxepane (=butanediol formal, BUFO) as cyclic ethers and also linear oligoformals or polyformals such as polydioxolane or polydioxepane. 1,3-dioxolane and 1,3-dioxepane are particularly preferred first comonomers (b1b), very particular preferred is 1,3-dioxepane as first comonomer b1b).

Polyoxymethylene (POM) polymers which can be obtained by reaction of a formaldehyde source together with the first comonomer (b1b) and a second comonomer (b1c) are likewise suitable. The addition of the second comonomer (b1c) makes it possible to prepare, in particular, polyoxymethylene (POM) terpolymers.

The second comonomer (b1c) is preferably selected from the group consisting of a compound of formula (III) and a compound of formula (IV),

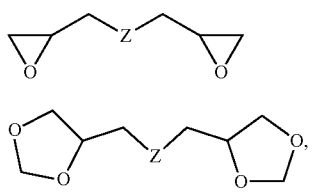
(III)

(IV)

wherein
Z is selected from the group consisting of a chemical bond, an (—O—) group and an (—O—$R^6$—O—) group, wherein
$R^6$ is selected from the group consisting of unsubstituted $C_1$-$C_8$-alkylene and $C_3$-$C_8$-cycloalkylene.

Within the context of the present invention, definitions such as $C_1$-$C_8$-alkylene means $C_1$-$C_8$-alkanediyle. The $C_1$-$C_8$-alkylene is a hydrocarbon having two free valences and a carbon atom number of from 1 to 8. The $C_1$-$C_8$-alkylene according to the present invention can be branched or unbranched.

Within the context of the present invention, definitions such as $C_3$-$C_8$-cycloalkylene means $C_3$-$C_8$-cycloalkanediyle. A $C_3$-$C_8$-cycloalkylene is a cyclic hydrocarbon having two free valences and a carbon atom number of from 3 to 8. Hydrocarbons having two free valences, a cyclic and also a linear component, and a carbon atom number of from 3 to 8 likewise fall under this definition.

Preferred examples of the second comonomer (b1c) are ethylene diglycidyl, diglycidyl ether and diethers prepared from glycidyl compounds and formaldehyde, dioxane or trioxane in a molar ratio of 2:1 and likewise diethers prepared from 2 mol of a glycidyl compound and 1 mol of an aliphatic diol having from 2 to 8 carbon atoms, for example the diglycidyl ether of ethylene glycol, 1,4-butanediol, 1,3-butanediol, 1,3-cyclobutanediol, 1,2-propanediol and 1,4-cyclohexanediol.

In a preferred embodiment component b1) is a polyoxymethylene (POM) copolymer which is prepared by polymerization of from at least 50 mol-% of a formaldehyde source, from 0.01 to 20 mol-% of at least one first comonomer (b1b) and from 0 to 20 mol-% of at least one second comonomer (b1c).

In a particularly preferred embodiment component (b1) is a polyoxymethylene (POM) copolymer which is prepared by polymerization of from 80 to 99.98 mol-%, preferably from 88 to 99 mol-% of a formaldehyde source, from 0.1 to 10 mol-%, preferably from 0.5 to 6 mol-% of at least one first comonomer (b1b) and from 0.1 to 10 mol-%, preferably from 0.5 to 6 mol-% of at least one second comonomer (b1c).

In a further preferred embodiment component b1) is a polyoxymethylene (POM) copolymer which is prepared by polymerization of from at least 50 mol-% of a formaldehyde source, from 0.01 to 20 mol-% of at least one first comonomer (b1b) of the general formula (II) and from 0 to 20 mol-% of at least one second comonomer (b1c) selected from the group consisting of a compound of formula (III) and a compound of formula (IV).

Another subject of the present invention is therefore a filament, wherein component b1) is a polyoxymethylene (POM) copolymer which is prepared by polymerization of
from at least 50 mol-% of a formaldehyde source (b1a),
from 0.01 to 20 mol-% of at least one first comonomer (b1b) of the general formula (II)

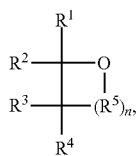
(II)

wherein
$R^1$ to $R^4$ are each independently of one another selected from the group consisting of H, $C_1$-$C_4$-alkyl and halogen-substituted $C_1$-$C_4$-alkyl;
$R^5$ is selected from the group consisting of a chemical bond, a (—$CR^{5a}R^{5b}$—) group and a (—$CR^{5a}R^{5b}$O—) group, wherein
$R^{5a}$ and $R^{5b}$ are each independently of one another selected from the group consisting of H and unsubstituted or at least monosubstituted $C_1$-$C_4$-alkyl, wherein the substituents are selected from the group consisting of F, Cl, Br, OH and $C_1$-$C_4$-alkyl;
n is 0, 1, 2 or 3; and
from 0 to 20 mol-% of at least one second comonomer (b1c) selected from the group consisting of a compound of formula (III) and a compound of formula (IV)

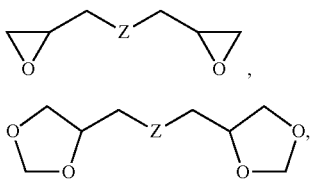

(III)

(IV)

wherein
- Z is selected from the group consisting of a chemical bond, an (—O—) group and an (—O—R$^6$—O—) group, wherein
- R$^6$ is selected from the group consisting of unsubstituted C$_1$-C$_8$-alkylene and C$_3$-C$_8$-cycloalkylene.

In a preferred embodiment of the present invention at least some of the OH-end groups of the polyoxymethylene (POM) are capped. Methods for capping OH-end groups are known to the skilled person. For example, the OH-end groups can be capped by etherification or esterification.

Preferred polyoxymethylene (POM) copolymers have melting points of at least 150° C. and weight average molecular weights M$_w$ in the range from 5 000 g/mol to 300 000 g/mol, preferably from 6 000 g/mol to 150 000 g/mol, particularly preferably in the range from 7 000 g/mol to 100 000 g/mol.

Particular preference is given to polyoxymethylene (POM) copolymers having a polydispersity (M$_w$/M$_n$) of from 2 to 15, preferably from 2.5 to 12, particularly preferably from 3 to 9.

The measurement of the weight average molecular weight (M$_w$) and the number average molecular weight (M$_n$) is generally carried out by gel permeation chromatography (GPC). GPC is also known as sized exclusion chromatography (SEC).

Methods for the preparation of polyoxymethylene (POM) are known to those skilled in the art.

Further, the binder (B) may comprise a component b2).

Preferably, the binder (B) comprises from 2 to 35% by weight, more preferably 3 to 20% by weight, most preferably 4 to 15% by weight of component b2).

Preferably component b2) is at least one polyolefin (PO). "At least one polyolefin (PO)" within the present invention means precisely one polyolefin (PO) and also mixtures of two or more polyolefins (PO).

Polyolefins (PO) are known per se and are commercially available. They are usually prepared by polymerization of C$_2$-C$_8$-alkene monomers, preferably by polymerization of C$_2$-C$_4$-alkene monomers.

Within the context of the present invention, C$_2$-C$_8$-alkene means unsubstituted or at least monosubstituted hydrocarbons having 2 to 8 carbon atoms and at least one carbon-carbon double bond (C—C-double bond). "At least one carbon-carbon double bond" means precisely one carbon-carbon double bond and also two or more carbon-carbon double bonds.

In other words, C$_2$-C$_8$-alkene means that the hydrocarbons having 2 to 8 carbon atoms are unsaturated. The hydrocarbons may be branched or unbranched. Examples for C$_2$-C$_8$-alkenes with one C—C-double bond are ethene, propene, 1-butene, 2-butene, 2-methyl-propene (=isobutylene), 1-pentene, 2-pentene, 2-methyl-1-butene, 3-methyl-1-butene, 1-hexene, 2-hexene, 3-hexene and 4-methyl-1-pentene. Examples for C$_2$-C$_8$-alkenes having two or more C—C-double bonds are allene, 1,3-butadiene, 1,4-pentadiene, 1,3-pentadiene, 2-methyl-1,3-butadiene (=isoprene).

If the C$_2$-C$_8$-alkenes have one C—C-double bond, the polyolefins (PO) prepared from those monomers are linear. If more than one double bond is present in the C$_2$-C$_8$-alkenes, the polyolefins (PO) prepared from those monomers can be crosslinked. Linear polyolefins (PO) are preferred.

It is also possible to use polyolefin (PO) copolymers, which are prepared by using different C$_2$-C$_8$-alkene monomers during the preparation of the polyolefins (PO).

Preferably, the polyolefins (PO) are selected from the group consisting of polymethylpentene, poly-1-butene, polyisobutylene, polyethylene and polypropylene. Particular preference is given to polyethylene and polypropylene and also their copolymers as are known to those skilled in the art and are commercially available.

The polyolefins (PO) can be prepared by any polymerization process known to the skilled person, preferably by free radical polymerization, for example by emulsion, bead, solution or bulk polymerization. Possible initiators are, depending on the monomers and the type of polymerization, free radical initiators such as peroxy compounds and azo compounds with the amounts of initiator generally being in the range from 0.001 to 0.5% by weight, based on the monomers.

The binder (B) may comprise a further polymer (FP) as component b3).

The terms "component b3)" and "further polymer (FP)" for the purpose of the present invention are synonymous and are used interchangeably throughout the present invention.

Preferably, the binder (B) comprises 2 to 40% by weight, more preferably 5 to 30% by weight, most preferably 10 to 26% by weight, based on the total weight of the binder (B), as component b3).

Component (b3) according to the present invention is at least one further polymer (FP). "At least one further polymer (FP)" within the present invention means precisely one further polymer (FP) and also mixtures of two or more further polymers (FP).

As already stated above, the at least one further polymer (FP) differs from component (b1), the polyoxymethylene (POM), and component (b2), the polyolefin (PO).

According to the present invention, the at least one further polymer (FP) is preferably selected from the group consisting of a polyether, a polyurethane, a polyepoxide, a polyamide, a vinyl aromatic polymer, a poly(vinyl ester), a poly(vinyl ether), a poly(alkyl(meth)acrylate) and copolymers thereof.

Another subject of the present invention is therefore a filament, wherein the further polymer (FP) is at least one further polymer (FP) selected from the group consisting of a polyether, a polyurethane, a polyepoxide, a polyamide, a vinyl aromatic polymer, a poly(vinyl ester), a poly(vinyl ether), a poly(alkyl (meth)acrylate) and copolymers thereof.

Preferably, component (b3), the at least one further polymer (FP), is selected from the group consisting of a poly (C$_2$-C$_6$-alkylene oxide), an aliphatic polyurethane, an aliphatic uncrosslinked epoxide, an aliphatic polyamide, a vinyl aromatic polymer, a poly(vinyl ester) of an aliphatic C$_1$-C$_8$ carboxylic acid, a poly(vinyl ether) of a C$_1$-C$_8$ alkyl vinyl ether, a poly(alkyl(meth)acrylate) of a C$_{1-8}$-alkyl and copolymers thereof.

Preferred at least one further polymers (FP) are described in more detail below.

Polyethers comprise repeating units of formula (V).

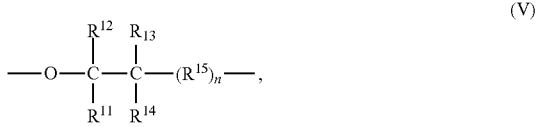

(V)

wherein
$R^{11}$ to $R^{14}$ are each independently of one another selected from the group consisting of H, $C_1$-$C_4$-alkyl and halogen-substituted $C_1$-$C_4$-alkyl;
$R^{15}$ is selected from the group consisting of a chemical bond, a ($-CR^{15a}R^{15b}-$) group and a ($-CR^{15a}R^{15b}O-$) group, wherein
$R^{15a}$ and $R^{15b}$ are each independently of one another selected from the group consisting of H and unsubstituted or at least monosubstituted $C_1$-$C_4$-alkyl, wherein the substituents are selected from the group consisting of F, Cl, Br, OH and $C_1$-$C_4$-alkyl;
n is 0, 1, 2 or 3.

If n is 0, then $R^{15}$ is a chemical bond between the adjacent carbon atom and the oxygen atom. If $R^{15}$ is a ($-CR^{15a}R^{15b}O-$) group, then the oxygen atom (O) of the ($-CR^{15a}R^{15b}O-$) group is bound to another carbon atom (C) of formula (V) and not to the oxygen atom (O) of formula (V). In other words, formula (V) does not comprise peroxide compounds. The same holds true for formula (VI).

Typical polyethers as well as their preparation are known to the skilled person.

A preferred polyether according to the present invention is, for example, a poly(alkylene glycol), also known as a poly(alkylene oxide).

Polyalkylene oxides and their preparation are known to the skilled person. They are usually synthesized by interaction of water and a bi- or polyvalent alcohol with cyclic ethers, i. e. alkylene oxides, of the general formula (VI). The reaction is catalyzed by an acidic or basic catalyst. The reaction is a so called ring-opening polymerization of the cyclic ether of the general formula (VI).

(VI)

wherein
$R^{11}$ to $R^{15}$ have the same meanings as defined above for formula (V).

A preferred poly(alkylene oxide) according to the present invention is derived from monomers of the general formula (VI) having 2 to 6 carbon atoms in the ring. In other words, preferably, the poly(alkylene oxide) is a poly($C_2$-$C_6$-alkylene oxide). Particular preference is given to a poly(alkylene oxide) derived from monomers selected from the group consisting of 1,3-dioxolane, 1,3-dioxepane and tetrahydrofuran (IUPAC-name: oxolane). In other words, particularly preferably, the poly(alkylene oxide) is selected from the group consisting of poly-1,3-dioxolane, poly-1,3-dioxepane and polytetrahydrofuran.

In one embodiment, the poly(alkylene oxide) can comprise OH-end groups. In another embodiment, at least some of the OH-end groups of the poly(alkylene oxide) can be capped. Methods for capping OH-end groups are known to the skilled person. For example, the OH-end groups can be capped by etherification or esterification.

The weight average molecular weight of the poly(alkylene oxide) is preferably in the range of from 1 000 to 150 000 g/mol, particular preferably from 15 00 to 120 000 g/mol and more preferably in the range of from 2 000 to 100 000 g/mol.

A polyurethane is a polymer having carbamate units. Polyurethanes as well as their preparation is known to the skilled person.

Within the present invention, aliphatic polyurethanes are preferred. They can, for example, be prepared by polyaddition of aliphatic polyisocyanates and aliphatic polyhydroxy compounds. Among the polyisocyanates, diisocyanates of the general formula (VII) are preferred

(VII), wherein $R^7$ is a substituted or unsubstituted $C_1$-$C_{20}$-alkylene or $C_4$-$C_{20}$-cycloalkylene, wherein the substituents are selected from the group consisting of F, Cl, Br and $C_1$-$C_6$-alkyl.

Preferably $R^7$ is a substituted or unsubstituted $C_2$-$C_{12}$-alkylene or $C_6$-$C_{15}$-cycloalkylene.

Within the context of the present invention, definitions such as $C_1$-$C_{20}$-alkylene means $C_1$-$C_{20}$-alkanediyle. The $C_1$-$C_{20}$-alkylene is a hydrocarbon having two free valences and a carbon atom number of from 1 to 20. The $C_1$-$C_{20}$-alkylene according to the present invention can be branched or unbranched.

Within the context of the present invention, definitions such as $C_4$-$C_{20}$-cycloalkylene means $C_4$-$C_{20}$-cycloalkanediyle. A $C_4$-$C_{20}$-cycloalkylene is a cyclic hydrocarbon having two free valences and a carbon atom number of from 4 to 20. Hydrocarbons having two free valences, a cyclic and also a linear component and a carbon atom number of from 4 to 20 likewise fall under this definition.

Preferred diisocyanates are selected from the group consisting of hexamethylenediisocyanate, 2,2,4-trimethyl hexamethylenediisocyanate, 2,4,4-trimethyl hexamethylenediisocyanate, 1,2-diisocyanatomethyl cyclohexane, 1,4-diisocyanatomethyl cyclohexane and isophorondiisocyanate (IUPAC-name: 5-iso-cyanato-1-(isocyanatomethyl)-1,3,3-trimethyl-cyclohexane).

The diisocyanates may also be used in oligomeric, for example dimeric or trimeric form. Instead of the polyisocyanates, it is also possible to use conventional blocked polyisocyanates which are obtained from the stated isocyanates, for example by an addition reaction of phenol or caprolactam.

Suitable polyhydroxy compounds for the preparation of aliphatic polyurethanes are, for example, polyesters, polyethers, polyesteramides or polyacetales or mixtures thereof.

Suitable chain extenders for the preparation of the polyurethanes are low molecular weight polyols, in particular diols and polyamines, in particular diamines or water.

The polyurethanes are preferably thermoplastic and therefore preferably essentially uncrosslinked, i. e. they can be melted repeatedly without significant signs of decomposition. Their reduced specific viscosities are as a rule from 0.5 to 3 dl/g, preferably from 1 to 2 dl/g measured at 30° C. in dimethylformamide.

A polyepoxide comprises at least two epoxide groups. The epoxide groups are also known as glycidyl or oxirane groups. "At least two epoxide groups" mean precisely two epoxide groups and also three or more epoxide groups.

Polyepoxides and their preparation is known to the person skilled in the art. For example, polyepoxides are prepared by the reaction of epichlorhydrine (IUPAC-name: chlormethyloxirane) and a diol, a polyol or a dicarboxylic acid. Polyepoxides prepared in this way are polyethers having epoxide end groups.

Another possibility to prepare polyepoxides is the reaction of glycidyl(meth)acrylate (IUPAC-name: oxiran-2-yl-methyl-2-methylprop-2-enoate) with polyolefins or polyacrylates. This results in polyolefins or polyacrylates having epoxy end groups.

Preferably, aliphatic uncrosslinked polyepoxides are used. Copolymers of epichlorhydrine and 2,2-bis-(4-hydroxyphenyl)-propane (bisphenol A) are particularly preferred.

Component b3) (the at least one further polymer (FP)) can also comprise a polyamide. Aliphatic polyamides are preferred.

The intrinsic viscosity of suitable polyamides is generally from 150 to 350 ml/g, preferably from 180 to 275 ml/g. Intrinsic viscosity is determined here from a 0.5% by weight solution of the polyamide in 96% by weight sulfuric acid at 25° C. in accordance with ISO 307.

Preferred polyamides are semicrystalline or amorphous polyamides.

Examples of polyamides suitable as component (b3) are those that derive from lactams having from 7 to 13 ring members. Other suitable polyamides are those obtained through reaction of dicarboxylic acids with diamines.

Examples that may be mentioned of polyamides that derive from lactams are polyamides that derive from polycaprolactam, from polycaprylolactam, and/or from polylaurolactam.

If polyamides are used that are obtainable from dicarboxylic acids and diamines, dicarboxylic acids that can be used are alkanedicarboxylic acids having from 6 to 14 carbon atoms, preferably from 6 to 10 carbon atoms. Aromatic dicarboxylic acids are also suitable.

Examples that may be mentioned here as dicarboxylic acids are adipic acid, azelaic acid, sebacic acid, dodecanedicarboxylic acid, and also terephthalic acid and/or isophthalic acid.

Examples of suitable diamines are alkanediamines, having from 4 to 14 carbon atoms, in particular alkanediamines having from 6 to 8 carbon atoms, and also aromatic diamines, for example m-xylylenediamine, di(4-aminophenyl)methane, di(4-aminocyclohexyl)methane, 2,2-di(4-aminophenyl)propane, 2,2-di(4-aminocyclohexyl)propane, and 1,5-diamino-2-methylpentane.

Other suitable polyamides are those obtainable through copolymerization of two or more of the monomers mentioned above and mentioned below, and mixtures of a plurality of polyamides in any desired mixing ratio.

Preferred polyamides are polyhexamethyleneadipamide, polyhexamethylenesebacamide, and polycaprolactam, and also nylon-6/6,6, in particular having a proportion of from 75 to 95% by weight of caprolactam units.

Particular preference is given to mixtures of nylon-6 with other polyamides, in particular with nylon-6/6,6 (PA 6/66), particular preference being given to mixtures of from 80 to 50% by weight of PA 6 and from 20 to 50% by weight of PA 6/66, where the PA 6/66 comprises from 75 to 95% by weight of caprolactam units, based on the total weight of the PA 6/66 in the mixture.

The following, non-exclusive list comprises the above-mentioned polyamides, and other suitable polyamides, and also the monomers comprised.

AB Polymers:

| | |
|---|---|
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |

AA/BB Polymers:

| | |
|---|---|
| PA 46 | Tetramethylenediamine, adipic acid |
| PA 66 | Hexamethylenediamine, adipic acid |
| PA 69 | Hexamethlyenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA MXD6 | m-Xylylenediamine, adipic acid |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 6 | Diaminodicyclohexylmethane, adipic acid |
| PA PACM 12 | Diaminodicyclohexylmethane, laurolactam |
| PA 6I/6T/PACM | as PA 6I/6T + diaminodicyclohexylmethane |
| PA12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

Preferred polyamides are PA 6, PA 66 and PA PACM 6.

Vinyl aromatic polymers are polyolefins having unsubstituted or at least monosubstituted styrene as monomer unit. Suitable substituents are, for example, $C_1$-$C_6$-alkyls, F, Cl, Br and OH. Preferred vinyl aromatic polymers are selected from the group consisting of polystyrene, poly-α-methylstyrene and copolymers thereof with up to 30% by weight of comonomers selected from the group consisting of acrylic esters, acrylonitrile and methacrylonitrile.

Vinyl aromatic polymers are commercially available and known to the person skilled in the art. The preparation of these polymers is also known to the person skilled in the art.

Preferably, the vinyl aromatic polymers are prepared by free radical polymerization, for example by emulsion, bead, solution or bulk polymerization. Possible initiators are, depending on the monomers and the type of polymerization, free radical initiators such as peroxide compounds and azo compounds with the amounts of initiator generally being in the range from 0.001 to 0.5% by weight, based on the monomers.

Poly(vinyl esters) and their preparation are known to the skilled person. Poly(vinyl esters) are preferably prepared by polymerization of vinyl esters. In a preferred embodiment of the present invention, the vinyl esters are vinyl esters of aliphatic $C_1$-$C_6$ carboxylic acids. Preferred monomers are vinyl acetate and vinyl propionate. These monomers form poly(vinyl acetate) and poly(vinyl propionate) polymers.

Poly(vinyl ethers) are prepared by polymerization of vinyl ether monomers. Poly(vinyl ethers) and their preparation are known to the skilled person. In a preferred embodiment, the vinyl ethers are vinyl ethers of aliphatic $C_1$-$C_8$ alkyl ethers. Preferred monomers are methyl vinyl ether and ethyl vinyl ether, forming poly(methyl vinyl ether) and poly(ethyl vinyl ether) during the polymerization.

Preferably, the poly(vinyl ethers) are prepared by free radical polymerization, for example by emulsion, bead, solution, suspension or bulk polymerization. Possible initiators are, depending on the monomers and the type of polymerization, free radical initiators such as peroxide compounds and azo compounds with the amounts of initiator generally being in the range from 0.001 to 0.5% by weight, based on the monomers.

Poly(alkyl(meth)acrylate) within the present invention comprises poly(alkyl acrylate), poly(alkyl methacrylates) and copolymers thereof. Poly(alkyl(meth)acrylate) comprises units derived from monomers of formula (VIII),

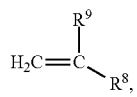
(VIII)

wherein $R^8$ is selected from the group consisting of H and $C_1$-$C_8$-alkyl and $R^9$ is a radical of formula (IX)

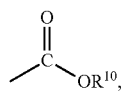
(IX)

wherein $R^{10}$ is a $C_1$-$C_{14}$-alkyl.

Preferably, $R^8$ is selected from the group consisting of H and $C_1$-$C_4$-alkyl, particularly preferably $R^8$ is H or methyl. Preferably, $R^{10}$ is a $C_1$-$C_8$-alkyl, particularly preferably, $R^{10}$ is methyl or ethyl.

If $R^8$ in formula (VIII) is H and $R^9$ is a radical of formula (IX) and $R^{10}$ in formula (IX) is methyl, then the monomer of formula (VIII) is methyl acrylate.

If $R^8$ in formula (VIII) is H and $R^9$ is a radical of formula (IX) and $R^{10}$ in formula (IX) is ethyl, the monomer of formula (VIII) is ethyl acrylate.

If $R^8$ in formula (VIII) is methyl and $R^9$ is a radical of formula (IX), then the monomers of formula (VI) are methacrylic esters.

Poly(alkyl(meth)acrylates) comprise as monomers preferably 40 to 100% by weight of methacrylic esters, particularly preferably 70 to 100% by weight of methacrylic esters and more preferably from 80 to 100% by weight of methacrylic esters, each based on the total amount of the poly(alkyl(meth)acrylates).

In another preferred embodiment, the poly(alkyl(meth)acrylates) comprise as monomers from 20 to 100% by weight of methyl acrylate, ethyl acrylate or a mixture thereof, preferably from 40 to 100% by weight of methyl acrylate, ethyl acrylate or a mixture thereof and particularly preferably from 50 to 100% by weight of methyl acrylate, ethyl acrylate or mixtures of thereof, each based on the total weight of the poly(alkyl(meth)acrylate).

Such polymers of monomers of the formula (VIII) with or without further monomers can be prepared in a conventional, preferably a free radical polymerization, for example an emulsion, bead, solution or bulk polymerization (cf. Kirk-Othmer, Encyclopedia of Chemical Technology $3^{rd}$ Ed., Vol. 1., pp. 330-342, Vol. 18, pp. 720-755, J. Wiley; H. Rauch-Puntigam, Th. Völker, Acryl-und Methacrylverbindungen). Possible initiators depending on the monomers and the type of polymerization are free radical initiators, such as peroxy or peroxo compounds and azo compounds. The amount of initiator being in general within the range from 0.001 to 0.5% by weight, based on the monomers.

Suitable initiators for an emulsion polymerization are, for example, peroxodisulfates and redox systems for a bulk polymerization not only peroxides, such as dibenzoyl peroxide or dilauroyl peroxide, but also azo compounds, for example azobisisobutyrodinitrile, similarly in the case of the solution or bead polymerization. The molecular weight may be regulated using conventional regulators, in particular mercaptans, e. g. dodecylmercaptan.

Preferably, the polymerization is carried out at elevated temperatures, for example above 50° C. The weight average molecular weight ($M_w$) is in general within the range of from 2 000 to 5 000 000 g/mol, preferably from 20 000 to 3 000 000 g/mol (determination by light scattering; cf. HoubenWeyl, Methoden der Org. Chemie, $4^{th}$ edition, Volume 14/1, Georg Thieme-Verlag Stuttgart 1961).

The person skilled in the art knows that the monomers described above for the preparation of the components b1), b2) and b3) can undergo changes in their structure during the polymerization reaction. Consequently, the building units of the polymers are not the same as the monomers from which they are derived. However, the person skilled in the art knows which monomers correspond to which building unit of the polymers.

Under the conditions of compounding or processing by fused filament fabrication, virtually no transacetalization occurs between component b1), the polyoxymethylene (POM), and component b3), the at least one further polymer (FP), i. e. virtually no exchange of comonomer units takes place.

In one embodiment of the invention the binder (B) in the core material (CM) comprises, besides b1), the components b2) and/or b3).

In a preferred embodiment, the binder (B) comprises besides b1), 2 to 35% by weight of component b2), based on the total weight of the binder (B), and/or from 2 to 40% by weight of component b3), based on the total weight of the binder (B).

In another embodiment of the invention the binder (B) comprises, besides b1), the components b2) and/or b3), wherein b2) is at least one polyolefin (PO) and b3) is at least one further polymer (FP), in case the at least one polymer (P) in component b) is a polyoxymethylene (POM).

The core material (CM) comprises as component c) 0 to 20% by volume, preferably 1.5 to 15% by volume, more preferably 2 to 10% by volume, based on the total volume of the core material (CM) of the at least one additive (A).

As component c), at least one additive (A) can be used. "At least one additive (A)" according to the present invention means precisely one additive (A) and also mixtures of two or more additives (A).

The additive (A) can be selected from among known dispersants. Examples are oligomeric polyethylene oxide having a low molecular weight of from 200 to 600 g/mol stearic acid, stearamides, hydroxystearic acids, fatty alcohols, fatty alcohol, fatty acid esters, sulfonates and block copolymers of ethylene oxide and propylene oxide and also, particularly preferably, polyisobutylene.

Further, the additive (A) may be selected from stabilizers, like UV-stabilizers and/or antioxidants.

The additive (A) may be selected from pigments, such as organic dyes and/or inorganic pigments.

The additive (A) may be selected from tackifiers, like polymers with a glass transition temperature below room temperature, which is preferably below 25° C. and/or terpene-derivatives.

The additive (A) may also be selected from the tackifiers as disclosed in WO 2013/117428 A1. An example for a commercially available tackifier is Acronal® A107.

Based on WO 2013/117428 A1 and applying the definitions of the components of the tackifiers in WO 2013/117428 A1, as tackifiers preferably dispersions are applied comprising at least one in water soluble dispersed polymerisate with a weighted average molecular weight of less than 50000 and a glass transition temperature higher or equal to −40° C. to lower or equal 0° C., preferably higher or equal −35° C. or equal 0° C., preferable of a monomer mixture comprising (a) at least 40% by weight of at least one C1 to C20-alkyl (meth) acrylate
(b) 0 to 30% by weight of at least one vinyl aromate
(c) at least 0.1% by weight of at least one acid monomer
(d) 0 to 50% by weight of further monomers, wherein the amounts of the monomers are based on the sum of all monomers.

Furthermore, tackifiers may be applied as disclosed in U.S. Pat. No. 4,767,813 and as specified in the following 3 paragraphs.

According to U.S. Pat. No. 4,767,813, the tackifier may be rosin or a derivative of rosin having a ring and ball softening temperature from about 25° to 110° C., preferably from about 50° to 110° C.

Suitable tackifiers include rosin, hydrogenated rosin esters, glycerol of rosin such as triglycerol rosin esters, $C_{2-3}$ alkylene esters of rosin such as triethylene glycol esters of rosin and tripropylene glycol esters of rosin; rosin salts, disproportionated rosin salts, pentaerythritol and the polyterpene resins including alpha and beta pinene. Suitable resins are sold under the tradenames Staybelite Ester 3, Staybelite Ester 10, Pentalyn H and Hercolyn D.

The tackifier resin may be a $C_5$ or $C_9$ synthetic tackifier resin having a ring and ball softening point from about 10° to 100° C., preferably from about 50° to 100° C. Suitable resins are sold under the tradenames Piccovar, Hercotac, Picconal and Piccolyte. These tackifiers are polymerized from $C_9$ monomers, preferably aromatic and $C_5$ monomers, preferably aliphatic.

The shell material (SM) comprises the components d) to f).

Component d) comprises 75 to 100% by volume, preferably 85 to 100% by volume, more preferably 95 to 100% by volume, based on the total volume of the shell material (SM) of at least one thermoplastic polymer (TP).

As thermoplastic polymer (TP), the person skilled in the art may select any technical appropriate thermoplastic polymer.

The thermoplastic polymer (TP) may also be identical with one of the polymers used in the binder (B) of the core material (CM).

"At least one thermoplastic polymer (TP)" within the present invention means precisely one thermoplastic polymer (TP) and also mixtures of two or more thermoplastic polymers (TP).

The at least one thermoplastic polymer (TP) may comprise thermoplastic homopolymers, thermoplastic copolymers, as well as blends of thermoplastic polymers.

Preferably, the thermoplastic polymer (TP) is selected from the group of polyoxymethylene (POM), polyolefins (PE) such as polypropylene, polyurethanes (PU), polyamides (PA), polyethers (PETH), polycarbonates (PC), and/or polyesters (PES), such as polylactic acid and blends thereof.

More preferably the thermoplastic polymer (TP) is selected from the group of polyoxymethylene (POM), polypropylene and/or polylactic acid (PLA) and blends thereof.

Component e) consists of 0 to 20% by volume, based on the total volume of the shell material (SM), of the at least one ceramic material precursor (CMP).

The at least one ceramic material precursor (CMP) in the component e) is identical to the ceramic material precursor (CMP) as defined for the component a) in the core material (CM).

Preferably, the component e) consists of 0% by volume, based on the total volume of the shell material (SM) of the at least one ceramic material precursor (CMP) and therefore there is preferably no component e) present in the shell material (CM).

However, in the embodiment of the invention wherein the component e) consists of preferably 0% by volume, based on the total volume of the shell material (SM) of the at least one inorganic powder (IP) there may be traces of ceramic material precursor (CMP) present in the shell material (SM) of less than t 1% by volume, based on the total volume of the shell material (SM).

Component f) comprises 0 to 25% by volume, preferably 0 to 15% by volume, more preferably 0 to 5% by volume, based on the total weight of the shell material (SM) of the at least one additive (A).

The at least one additive (A) in the component f) is selected from the same compounds as the additive (A) in the component c). The at least one additive (A) of component f) or the combination of additives (A) in component f), may differ individually from the at least one additive (A) of component c) or combination of additives (A) of component c) or be the same in a single embodiment of the invention.

In one embodiment of the invention the core material (CM) comprises the components a), b) and c)
a) 30 to 80% by volume, preferably 40 to 68% by volume, more preferably 50 to 65% by volume, based on the total volume of the core material (CM), of at least one ceramic material precursor (CMP),
b) 20 to 70% by volume, preferably 20 to 60% by volume, more preferably 20 to 50% by volume based on the total volume of the core material (CM) of the at least one binder b) comprising component b1)
b1) at least one polymer (P),
c) 0 to 20% by volume, preferably 1.5 to 15% by volume, more preferably 2 to 10% by volume, based on the total volume of the core material (CM) of the at least one additive (A),
and the shell material (SM) comprises the components d) and f)
d) 75 to 100% by volume, based on the total weight of the shell material (SM) of at least one thermoplastic polymer (TP),
e) 0 to 20% by volume, based on the total volume of the shell material (SM) of the at least one ceramic material precursor (CMP),
f) 0 to 25% by volume, preferably 0 to 10% by volume, more preferably 0 to 5% by volume, most preferably 0 to 3% by volume, based on the total volume of the shell material (SM) of the at least one additive (A), wherein the thickness of the layer of shell material (SM) is 0.05 to 0.5 mm, preferably 0.09 to 0.3 mm, more preferably 0.1 to 0.25 mm.

In a further embodiment of the invention the core material (CM) comprises the components a), b) and c)
- a) 30 to 80% by volume, preferably 40 to 68% by volume, more preferably 50 to 65% by volume, based on the total volume of the core material (CM), of at least one ceramic material precursor (CMP),
- b) 20 to 70% by volume, preferably 20 to 60% by volume, more preferably 20 to 50% by volume based on the total volume of the core material (CM) of the at least one binder b) comprising component b1)
- b1) at least one polymer (P)
- c) 0 to 20% by volume, preferably 1.5 to 15% by volume, more preferably 2 to 10% by volume, based on the total volume of the core material (CM) of the at least one additive (A),
  and the shell material (SM) comprises the components d) and f)
- d) 75 to 100% by volume, based on the total weight of the shell material (SM) of at least one thermoplastic polymer (TP)
- e) 0 to 20% by volume, based on the total volume of the shell material (SM) of the at least one ceramic material precursor (CMP),
- f) 0 to 25% by volume, preferably 0 to 10% by volume, more preferably 0 to 5% by volume, most preferably 0 to 3% by volume, based on the total volume of the shell material (SM) of the at least one additive (A).

In another embodiment of the invention the core material (CM) comprises the components a) and b)
- a) 30 to 80% by volume, preferably 40 to 68% by volume, more preferably 50 to 65% by volume, based on the total volume of the core material (CM), of at least one ceramic material precursor (CMP),
- b) 20 to 70% by volume, 20 to 60% by volume, more preferably 20 to 50% by volume based on the total volume of the core material (CM) of the at least one binder b) comprising component b1)
- b1) at least one polymer (P)
- c) 0 to 20% by volume, preferably 1.5 to 15% by volume, more preferably 2 to 10% by volume, based on the total volume of the core material (CM) of the at least one additive (A),
  and the shell material (SM) comprises the component d)
- d) 100% by volume, based on the total weight of the shell material (SM) of at least one thermoplastic polymer (TP)
- e) 0% by volume, based on the total volume of the shell material (SM) of the at least one ceramic material precursor (CMP),
- f) 0% by volume, based on the total volume of the shell material (SM) of the at least one additive (A), wherein the thickness of the layer of shell material (SM) is 0.05 to 0.5 mm, preferably 0.09 to 0.3 mm, more preferably 0.1 to 0.25 mm.

In a further embodiment, of the invention the core material (CM) comprises the components a) and b)
- a) 30 to 80% by volume, preferably 40 to 68% by volume, more preferably 50 to 65% by volume, based on the total volume of the core material (CM), of at least one ceramic material precursor (CMP),
- b) 20 to 70% by volume, 20 to 60% by volume, more preferably 20 to 50% by volume based on the total volume of the core material (CM) of the at least one binder b) comprising component b1)
- b1) at least one polymer (P),
- c) 0 to 20% by volume, preferably 1.5 to 15% by volume, more preferably 2 to 10% by volume, based on the total volume of the core material (CM) of the at least one additive (A),
  and the shell material (SM) comprises the component d)
- d) 100% by volume, based on the total weight of the shell material (SM) of at least one thermoplastic polymer (TP)
- e) 0% by volume, based on the total volume of the shell material (SM) of the at least one ceramic material precursor (CMP),
- f) 0% by volume, based on the total volume of the shell material (SM) of the at least one additive (A).

The ceramic material precursor is selected from the group consisting of $SiO_2$, $CaCO_3$, $CaSiO_3$, $CaO$, $Al_2O_3$, $xAl_2O_3 \cdot ySiO_2 \cdot zH_2O$ (aluminum silicate), $TiO_2$, $NaAlSi_3O_8$, $KAlSi_3O_8$, $CaAl_2Si_2O_8$, $CaAl_2Si_2O_8$ (Feldspar), iron oxide ($FeO$, $Fe_2O_3$, $Fe_3O_4$), $BaO$, and $K_2O$ and mixtures thereof.

The process for the preparation of the filament comprises coating a core material (CM) with a layer of a shell material (SM) by co-extrusion of the core material (CM) with the shell material (SM).

The co-extrusion technique as such is known to the person skilled in the art.

Based on the applied materials for the core and the shell material, the person skilled in the art may choose the respective appropriate co-extrusion temperatures and process parameters.

Another subject of the invention is a process for producing a three-dimensional object by a fused filament fabrication process comprising the steps:

i) depositing a support material into a build chamber using a layer-based additive technique to form a support structure, ii) depositing a modeling material into the build chamber using the layer based additive technique to form the three-dimensional object, wherein the three-dimensional object (the three-dimensional green body) comprises at least one region supported by the support structure, wherein the support material comprises the filament as defined above.

Step ii) is followed by a step iii), in which the three-dimensional object obtained in step ii) is debinded to remove organic polymer.

Step iii) is followed by a step iv), in which the three-dimensional object (the three-dimensional brown body) obtained in step iii) is sintered to form a three-dimensional sintered object (three-dimensional sintered body) and the support structure is removed from the three-dimensional sintered object.

The three-dimensional green body can then either be brought directly to the debinding oven with the support material still attached or the support material can be manually removed from the metal composite build structure. The debinding method is performed in a heated oven in the presence of a gaseous acid. After debinding the support structure may also be removed or may be brought into the sintering step along with the metal composite structure. Preferably, the support structure is removed after sintering. After sintering the sintered metal part and the sintered ceramic part can be easily separated due to poor adhesion of ceramic and metal sintered parts.

The fused filament fabrication process for the production of three-dimensional objects is well known in the state of the art and detailed explained in the above cited documents. The fused filament fabrication process is also denominated as 3D-printing process.

Preferably, the modeling material comprises a filament described in WO2017009190. The filament for the modeling material is also a core/shell filament and comprises the same components as the filament for the support material described above, except that the ceramic material precursor (CEM) is replaced by a metal, or metal alloy (ME). For all components of the filament for the modeling material, which are same as in case of the filament for the support material, the above-stated embodiments and preferences for the components of the filament for the support material apply.

"A metal" means precisely one metal as well as mixtures of two or more metals. A metal within the present invention can be selected from any metal of the periodic table of the elements which is stable under the conditions of a fused filament fabrication process and which can form three-dimensional objects. Preferably, the metal is selected from the group consisting of aluminum, yttrium, titanium, zirconium, vanadium, niobium, chromium, molybdenum, tungsten, manganese, iron, carbonyl iron powder (CIP), cobalt, nickel, copper, silver, zinc and cadmium, more preferably, the metal is selected from the group consisting of titanium, niobium, chromium, molybdenum, tungsten, manganese, iron, carbonyl iron powder (CIP), nickel and copper. With particular preference, the metal is selected from the group consisting of titanium, iron and carbonyl iron powder (CIP).

Carbonyl iron powder (CIP) is highly pure iron powder, prepared by chemical decomposition of purified iron pentacarbonyl.

"A metal alloy" means precisely one metal alloy as well as mixtures of two or more metal alloys. Within the context of the present invention, the term "metal alloy" means a solid solution or a partial solid solution, which exhibits metallic properties and comprises a metal and another element. "A metal" means, as stated above precisely one metal and also mixtures of two or more metals. The same applies to "another element".

"Another element" means precisely one other element and also mixtures of two or more other elements.

Solid solution metal alloys exhibit a single solid phase microstructure while partial solid solution metal alloys exhibit two or more solid phases. These two or more solid phases can be homogeneous distributed in the metal alloy, but they can also be heterogeneous distributed in the metal alloy.

The metal alloys can be prepared according to any process known to the person skilled in the art. For example, the metal can be melted and the other element can be added to the molten metal. However, it is also possible, to add the metal and the other element directly to the core material (CM) without the preparation of a metal alloy before. The metal alloy will then be formed during the process of the preparation of the three-dimensional object.

Preferably, the modeling material comprises a filament comprising a core material (CM) coated with a layer of shell material (SM), wherein the core material (CM) comprises the components a) to c)

a) 30 to 80% by volume, based on the total volume of the core material (CM) of a powder of at least one metal, or metal alloy (ME), b) 20 to 70% by volume, based on the total volume of the core material (CM) of at least one binder (B) comprising component b1)

b1) at least one polymer (P), c) 0 to 20% by volume, based on the total volume of the core material (CM) of at least one additive (A), and the shell material (SM) comprises the components d) to f)

d) 75 to 100% by volume, based on the total volume of the shell material (SM) of at least one thermoplastic polymer (TP)

e) 0 to 20% by volume, based on the total volume of the shell material (SM) of the at least one metal, or metal alloy (ME), f) 0 to 25% by volume, based on the total weight of the shell material (SM) of the at least one additive (A), wherein the thickness of the layer of shell material is 0.05 to 0.5 mm.

Step i) and ii) can be divided into steps ia), ib), ic), ia) providing the filament (for the support material, or for the model material) on a spool to a noozle, ib) heating the filament to a temperature ($T_M$), ic) depositing of the heated filament obtained in step ib) in a build chamber using a layer based additive technique in order to form the three dimensional green-body.

According to step ia), the filament, is provided on a spool to a nozzle.

According to step ib), the filament is heated to a temperature ($T_M$). The temperature ($T_M$) is above the melting point of the binder (B). Methods for the determination of the melting point of the binder (B) are known to the skilled person. For example, the melting point of the binder (B) can be estimated by differential scanning calorimetry (DSC).

In a preferred embodiment according to the present invention, in process step ib) the filament is heated to a temperature ($T_M$) that is at least 1° C., preferably at least 5° C. and particularly preferably at least 10° C. above the melting point of the binder (B).

In another preferred embodiment the filament is heated to a temperature ($T_M$) in the range of from 140 to 240° C., preferably of from 160 to 220° C.

Another subject of the present invention is therefore a process for the production of a three-dimensional green body, wherein the temperature ($T_M$) in step ib) is from 140 to 240° C.

According to step ic), the filament is deposited into a build chamber using the layer-based additive technique. The temperature of the build chamber is usually in the range of from 30 to 100° C., preferably of from 40 to 90° C. and particularly preferably of from 50 to 80° C.

In other words, in step ia) to ic) of the inventive process, the filament generally is initially present in a solid state and thereafter melted and printed to form a three-dimensional object comprising the filament. The so prepared three-dimensional object is also called "three-dimensional green body".

Process step ii) is followed by a process step iii) in which at least a part of the binder (B) and/or at least a part of the shell material (SM) are removed from the three-dimensional green body.

Another subject of the present invention is therefore a process for the production of a three-dimensional green body, in which at least a part of the acid sensitive components of the binder (B) and/or at least a part of the acid sensitive components of the shell material (CM) are removed from the three-dimensional green body to form a three-dimensional brown body.

After the at least partial removal of the binder (B) and/or at least a part of the shell material (SM), the resulting three-dimensional object is called a "three-dimensional brown body". The three-dimensional brown body comprises the ceramic material precursor (CMP), the fraction of the binder (B) and the fraction of the shell material (SM) which were not removed during the step iii). The person skilled in the art knows that a three-dimensional brown body comprising a ceramic material precursor (CMP) is also called a three-dimensional white body. However, for the purpose of the present invention, the terms "three-dimensional brown body" and "three-dimensional white body" are used synonymous and are interchangeably.

To remove at least part of the binder (B) in process step iii) and/or at least a part of the of the shell material (SM), the three-dimensional green body obtained by the fused filament fabrication process is preferably treated with a gaseous acid comprising atmosphere. Appropriate processes are described, for example, in US 2009/0288739 and U.S. Pat. No. 5,145,900. This process step iii) is, according to the invention, preferably carried out at temperatures below the melting temperature of the binder (B). Process step d) is preferably carried out at a temperature at least 1° C. below the melting point of the binder (B), preferably at least 5° C. below the melting point of the binder (B) and particularly preferably at least 10° C. below the melting point of the binder (B).

Another subject of the present invention is therefore a process for the production of a three-dimensional brown body, wherein in step iii) at least a part of the binder (B) and/or at least a part of the shell material (SM) is removed at a temperature below the melting point of the binder (B) and/or the shell material (SM).

In general, the process step iii) is carried out at a temperature in the range of from 20 to 180° C. and particularly preferably of from 100 to 150° C. Preferably, process step d) is carried out for a period of from 0.1 to 24 h, particularly preferably of from 0.5 to 12 h.

The treatment time required depends on the treatment temperature and the concentration of the acid in the treatment atmosphere and also on the size of the three-dimensional object.

Another subject of the present invention is therefore a process for the production of a three-dimensional brown body, wherein in step iii) at least a part of the binder and/or at least a part of the shell material (SM) are removed by acidic treatment.

Suitable acids for process step iii) of the present invention are, for example, inorganic acids which are either gaseous at room temperature or can be vaporized at the treatment temperature or below. Examples are hydrogen halides and nitric acid. Hydrogen halides are hydrogen fluoride, hydrogen chloride, hydrogen bromide and hydrogen iodide. Suitable organic acids are those, which have a boiling point at atmosphere pressure of less than 130° C., e. g. formic acid, acetic acid or trifluoroacetic acid and mixtures thereof. Acids with boiling points above 130° C., for example methanesulfonic acid, can also be utilized in process step d) when dosed as a mixture with a lower boiling acid and/or water. Preferred acids for process step d) are nitric acid, a 10% by weight solution of oxalic acid in water or a mixture of 50% by volume of methanesulfonic acid in water.

Furthermore, $BF_3$ and its adducts with inorganic ethers can be used as acids.

If a carrier gas is used, the carrier gas is generally passed through the acid and loaded with the acid beforehand. The carrier gas, which has been loaded in this way with the acid, is then brought to the temperature at which process step d) is carried out. This temperature is advantageously higher than the loading temperature in order to avoid condensation of the acids. Preferably, the temperature at which process step d) is carried out is at least 1° C., particularly preferably at least 5° C. and most preferably at least 10° C. higher than the loading temperature.

Preference is given to mixing the acid into the carrier gas by means of a metering device and heating the gas mixture to such a temperature that the acid can no longer condense. Preferably, the temperature is at least 1° C., particularly preferably at least 5° C. and most preferably at least 10° C. higher than the sublimation and/or vaporization temperature of the acid and/or the carrier gas.

The carrier gas in general is any gas that is inert under the reaction conditions of the step d). A preferred carrier gas according to the present invention is nitrogen.

It is known to the person skilled in the art that not all components which may be comprised by the binder (B) and/or the shell material (SM) in different embodiments of the invention are removable in step iii) due to their chemical and physical properties.

Therefore, the part of binder (B) and/or shell material (SM) which can be removed in step iii) in different embodiments of the invention may vary dependent on the specific compounds used.

Preferably, the step iii) is continued until the binder (B) and/or the shell material (SM) have been removed to an extend of at least 40% by weight, more preferably at least 60% by weight, most preferably at least 80% by weight, particularly preferably at least 90% by weight and more particularly preferably at least 95% by weight based on the total weight of the binder (B) and/or the shell material (SM). This can be checked, for example, with the height of the weight decrease.

It is known to the person skilled in the art that at the temperatures of the step iii) step, the ceramic material precursor (CMP) (and the powder of the metal, or metal alloy) comprised in the three-dimensional green body can undergo chemical and/or physical reactions. In particular, the particles of the ceramic material precursor (CMP) can fuse together and the ceramic material precursor (CMP) can undergo solid state phase transitions.

The same holds true for the binder (B) and the shell material (SM). During the step iii) step the composition of the binder (B) can change.

Consequently, in one embodiment of the present invention, the ceramic material precursor (CMP) (and the powder of the metal, or metal alloy (ME)), the binder (B) and/or the shell material (SM) comprised in the three-dimensional brown body obtained in process step iii) differs from the ceramic material precursor (CMP) and/or the binder (B) comprised in the three-dimensional brown body obtained in process step c).

Process step iii) can be followed by a process step iv) in which the three-dimensional brown body is sintered. Process step iv) is also called sintering. The terms "process step iv)" and "sintering" for the purpose of the present invention are synonymous and are used interchangeably throughout the present invention.

Another subject of the present invention is therefore a process for the production of a three-dimensional green body, wherein step iii) is followed by a step iv), in which the three-dimensional brown body is sintered to form a three-dimensional sintered body.

After the sintering, the three-dimensional object is a three-dimensional sintered body. The three-dimensional sintered body comprises the ceramic material (CEM) and is essentially free of the binder (B) and the shell material (SM).

"Essentially free of the binder (B) and the shell material (SM)" according to the present invention means that the three-dimensional sintered body comprises less than 5% by volume, preferably less than 2% by volume, particularly preferably less than 0.5% by volume and most preferably less than 0.01% by volume of the binder (B) and the shell material (SM).

It is known to the skilled person that during the sintering process the ceramic material precursor (CMP) is sintered together to give a sintered ceramic material. Furthermore, during the sintering process the ceramic material precursor (CMP) can undergo chemical and/or physical reactions.

In one embodiment of the present invention, after process step iii) and before process step iv), the three-dimensional brown body obtained in process step iii) is heated for preferably 0.1 to 12 h, particularly preferably from 0.3 to 6 h, at a temperature of preferably from 250 to 700° C., particularly preferably from 250 to 600° C. to remove the residual binder (B) and the residual shell material (SM) completely.

The temperature as well as the duration and the atmosphere during process step iv) depends on the ceramic material precursor (CMP) comprised in the mixture filament as component a). The temperature program of the sintering process, the duration and the atmosphere is in general adapted to the needs of the ceramic material precursor (CMP) comprised in the filament as component a). Suitable conditions for process step e) are known to the skilled person.

In general, process step iv) is carried out under the atmosphere of a gas that is inert with regard to the ceramic material precursor (CMP) (and the powder of the metal, or metal alloy (ME)) and the binder (B). Typical inert gases are for example nitrogen and/or argon.

Depending on the ceramic material precursor (CMP) (and the powder of the metal, or metal alloy (ME)) comprised in the filament, it is also possible to carry out process step iv) in air, under vacuum or in hydrogen atmosphere.

The temperature in process step iv) is in general in the range of from 750 to 1600° C., preferably of from 800 to 1500° C. and particularly preferably of from 850 to 1450° C.

Step iv) includes removal of the support structure from the three-dimensional sintered object. Due to poor adhesion with metals the support structure can be mechanically separated.

Further subjects of the invention are also the three-dimensional green body, the three-dimensional brown-body and the three-dimensional sintered body prepared by the processes as specified above.

The following examples further illustrate the invention.

The filament in the example(s) were prepared by co-extrusion of the core material and the shell material applying the following materials, equipment and processing parameters.

Materials:
Core Material for Example 1:
"Core-58": 58 vol % aluminum oxide powder (D50=1-3 micron), 6 vol % poly(1,3-dioxepane) and 31 vol % polyacetal (POM), 5 vol % dispersing agents
Core Material for Example 2:
"Core-35": 35 vol % carbonate powder (Omyacarb 1T, D50=2.1 micron), 65 vol % polyacetal (POM)
Shell Material:
POM (Polyacetal; tradename: Ultraform)
Equipment:
Extrusion equipment: 2 Teach-Line E20T extruders with a Polyolefin Screw 8/6/11 with compression 3.08
Die: modified blow-film die matrix Ø3.6 mm
Additional equipment: Waterbath
Conveyor BAW130T
Zumbach diameter measurement
Processing Parameters:
All polymers were dried before processing at 80° C. using an air dryer and conveyer speed of 7 m/min

EXAMPLE 1

Core Material:
Extruder with "Core-58"
Zone 1 190° C., Zone 2 200° C., Skin Adapter 200° C., Die 200° C.
Screw speed 50 rpm
Pressure 14 bar
Outside Layer of Shell Material:
Co-extrusion with POM Ultraform H2320
Zone 1 175° C., Zone 2 185° C., Skin adapter 190° C.
Screw speed 25 RPM
Pressure 22 bar
Filament Properties:
Diameter 2.75 mm, Ovality 0.03 mm
Core diameter: 2.45 mm Outside layer thickness: 0.15 mm

EXAMPLE 2

Core Material:
Extruder with "Core-35"
Zone 1 170° C., Zone 2 180° C., Skin Adapter 190° C., Die 190° C.
Screw speed 40 rpm
Outside Layer of Shell Material:
Co-extrusion with POM Ultraform H2320
Zone 1 175° C., Zone 2 185° C., Skin adapter 190° C.
Screw speed 25 RPM
Filament Properties:
Diameter 2.89 mm, Ovality 0.1 mm
Core diameter: 2.53 mm
Thickness of shell material: 0.36 mm

EXAMPLE 3

Application of Core/Shell Composite Filament in FFF Printing:
Printer—German Reprap X400 Dual extrusion (FFF Desktop standard, open source software compatible)
Software: Open source software (i.e. Cura, Simplify3d, Slic3r)
Hardware: direct drive dual extruder print heads with modular hotend (temp limit 270° C.), heated bed
Printing procedure: a CAD file is loaded into the slicing software and the printing configuration is set according to desired speed and quality requirements. Typical print speed=30 mm/s, standard nozzle thickness=0.4-0.5 mm, standard printing layer height=0.2 mm). The model is then set to co-print the support structures for the appropriate areas (with ceilings or overhangs).

The first extruder is loaded with the metal composite filament (build material) and the second extruder is loaded with the ceramic composite filament of Example 1, or 2 (support material). The printing proceeds layer by layer, and within each layer the printing heads alternate to print the appropriate structures for the build or supports.

For the metal composite filament systems bound with POM the typical hotend temperature is 210° C.-220° C. The temperature is not to exceed 230° C. to prevent degradation of the binding material. For the ceramic composite filament systems bound with POM the typical hotend temperature is 190° C.-205° C. The temperature is not to exceed 230° C. to prevent degradation of the binding material.

Debinding and Sintering Procedure:

The part can then either be brought directly to the debinding oven with the support material still attached or the support material can be manually removed from the metal composite build structure. The debinding method, as previously described, is performed in a heated oven in the presence of a gaseous acid. After debinding the support structure may also be removed or may be brought into the sintering step along with the metal composite structure. After sintering the sintered metal part and the sintered ceramic can be easily separated due to poor adhesion of ceramic and metal sintered parts.

The invention claimed is:

1. A process for producing a three-dimensional object by a fused filament fabrication process comprising the steps:
   i) depositing a support material into a build chamber using a layer-based additive technique to form a support structure,
   ii) depositing a modeling material into the build chamber using the layer based additive technique to form the three-dimensional object, wherein the three-dimensional object comprises at least one region supported by the support structure, wherein the support material comprises a filament, said filament comprising a core material (CM) coated with a layer of shell material (SM) as a support material in a fused filament fabrication process, wherein the core material (CM) comprises the components a) to c)
      a) 30 to 80% by volume, based on the total volume of the core material (CM) of at least ceramic material precursor (CMP),
      b) 20 to 70% by volume, based on the total volume of the core material (CM) of at least one binder (B) comprising component b1)
      b1) at least one polymer (P)
      c) 0 to 20% by volume, based on the total volume of the core material (CM) of at least one additive (A),
      and the shell material (SM) comprises the components d) to f)
      d) 75 to 100% by volume, based on the total volume of the shell material (SM) of at least one thermoplastic polymer (TP),
      e) 0 to 20% by volume, based on the total volume of the shell material (SM) of the at least one ceramic material precursor (CMP),
      f) 0 to 25% by volume, based on the total weight of the shell material (SM) of the at least one additive (A), wherein the thickness of the layer of shell material is 0.05 to 0.5 mm;
   wherein the polymer (P) in component (b1) is a polyoxymethylene (POM) copolymer which is prepared by polymerization of
      from at least 50 mol-% of a formaldehyde source (b1a),
      from 0.01 to 20 mol-% of at least one first comonomer (b1b) of formula (II)

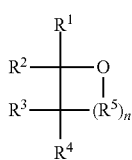

$R^1$ to $R^4$ are each independently of one another selected from the group consisting of H, $C_1$-$C_4$-alkyl and halogen-substituted $C_1$-$C_4$-alkyl;

$R^5$ is selected from the group consisting of a chemical bond, a ($-CR^{5a}R^{5b}-$) group and a ($-CR^{5a}R^{5b}O-$) group, wherein $R^{5a}$ and $R^{5b}$ are each independently of one another selected from the group consisting of H and unsubstituted or at least monosubstituted $C_1$-$C_4$-alkyl, wherein the substituents are selected from the group consisting of F, Cl, Br, OH and $C_1$-$C_4$-alkyl;

n is 0, 1, 2, or 3; and from 0 to 20 mol-% of at least one second comonomer (b1c) selected from the group consisting of a compound of formula (III) and a compound of formula (IV)

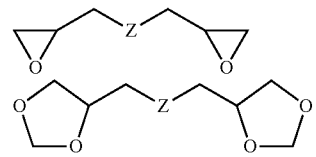

Z is selected from the group consisting of a chemical bond, an ($-O-$) group and an ($-O-R^6-O-$) group, wherein $R^6$ is selected from the group consisting of unsubstituted $C_1$-$C_8$-alkylene and $C_3$-$C_8$-cycloalkylene.

2. The process according to claim 1, wherein the binder (B)
   i) comprises from 50 to 96% by weight of the at least one polymer (P), based on the total weight of the binder, and/or
   ii) the at least one polymer (P) is a polyoxymethylene (POM).

3. The process according to claim 1, wherein the binder (B) in the core material (CM) further comprises components b2) and/or b3)
   b2) at least one polyolefin (PO),
   b3) at least one further polymer (FP), in case component b) is a polyoxymethylene (POM).

4. The process according to claim 3, wherein the binder (B) comprises 2 to 35% by weight of component b2), based on the weight of the binder (B), and/or from 2 to 40% by weight of component b3), based on the weight of the binder (B).

5. The process according to claim 1, wherein
   i) the diameter of the filament is 1.5 to 3.5 mm, and/or
   ii) the diameter of the core material is 1.5 to 3.0 mm, and/or
   iii) the thickness of the layer of shell material (SM) is 0.04 to 0.5 mm, and/or
   iv) the particle size of the ceramic material precursor is from 0.1 to 80 μm, and/or
   v) the ceramic material precursor is selected from the group consisting of $SiO_2$, $CaCO_3$, $CaSiO_3$, $CaO$, $Al_2O_3$, $xAl_2O_3$, $ySiO_2$, $zH_2O$, $TiO_2$, $NaAlSi_3O_8$, $KAlSi_3O_8$ $CaAl_2Si_2O_8$, iron oxide (FeO, $Fe_2O_3$, $Fe_3O_4$), BaO, and $K_2O$ and mixtures thereof, and/or
   vi) the at least one thermoplastic polymer (TP) of the shell material (SM) is selected from the group consisting of polyoxymethylene (POM), polyolefins (PE), polyurethanes (PU), polyamides (PA), polyethers (PETH), polycarbonates (PC), polyesters (PES) and blends thereof.

6. The process according to claim 3, wherein the further polymer (FP) is at least one further polymer (FP) selected from the group consisting of a polyether, a polyurethane, a polyepoxide, a polyamide, a vinyl aromatic polymer, a poly(vinyl ester), a poly(vinyl ether), a poly(alkyl (meth) acrylate) and copolymers thereof.

7. The process according to claim 1, wherein the modeling material comprises a filament comprising a core material (CM) coated with a layer of shell material (SM), wherein the core material (CM) comprises the components a) to c)
- a) 30 to 80% by volume, based on the total volume of the core material (CM) of a powder of at least one metal, or metal alloy (ME),
- b) 20 to 70% by volume, based on the total volume of the core material (CM) of at least one binder (B) comprising component b1),
- b1) at least one polymer (P),
- c) 0 to 20% by volume, based on the total volume of the core material (CM) of at least one additive (A), and the shell material (SM) comprises the components d) to f),
- d) 75 to 100% by volume, based on the total volume of the shell material (SM) of at least one thermoplastic polymer (TP),
- e) 0 to 20% by volume, based on the total volume of the shell material (SM) of the at least one metal, or metal alloy,
- f) 0 to 25% by volume, based on the total weight of the shell material (SM) of the at least one additive (A), wherein the thickness of the layer of shell material is 0.05 to 0.5 mm.

8. The process according to claim 1, wherein step ii) is followed by a step iii), in which the three-dimensional object obtained in step ii) is debinded to remove organic polymer.

9. The process according to claim 1, wherein step iii) is followed by a step iv), in which the three-dimensional object obtained in step iii) is sintered to form a three-dimensional sintered object and the support structure is removed from the three-dimensional sintered object.

* * * * *